(12) United States Patent
Nohira et al.

(10) Patent No.: US 8,814,577 B2
(45) Date of Patent: Aug. 26, 2014

(54) ELECTRIC CONNECTING STRUCTURE BETWEEN SUBSTRATE AND ELECTRIC COMPONENT AND METHOD OF CONNECTION BETWEEN SUBSTRATE AND ELECTRIC COMPONENT

(71) Applicant: Advics Co., Ltd., Kariya (JP)

(72) Inventors: Shigemitsu Nohira, Kariya (JP); Yuta Umemura, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 65 days.

(21) Appl. No.: 13/712,915

(22) Filed: Dec. 12, 2012

(65) Prior Publication Data

US 2013/0149880 A1 Jun. 13, 2013

(30) Foreign Application Priority Data

Dec. 12, 2011 (JP) ................................. 2011-271140
Jul. 24, 2012 (JP) ................................. 2012-163454

(51) Int. Cl.
 *H01R 12/00* (2006.01)
(52) U.S. Cl.
 USPC .......................................... 439/76.1; 29/842
(58) Field of Classification Search
 USPC ............................ 439/76.1, 76.2; 29/832, 842
 See application file for complete search history.

(56) References Cited

U.S. PATENT DOCUMENTS

| | | | | |
|---|---|---|---|---|
| 5,382,169 A * | 1/1995 | Bailey et al. | ................. | 439/76.2 |
| 5,707,243 A * | 1/1998 | Endo et al. | ................... | 439/76.2 |
| 6,183,269 B1 * | 2/2001 | Sarkissian et al. | ........... | 439/76.1 |
| 6,227,871 B1 * | 5/2001 | Bender | ........................... | 439/67 |
| 6,690,582 B2 * | 2/2004 | Sumida | ......................... | 361/752 |
| 6,799,812 B2 | 10/2004 | Risch et al. | | |
| 6,821,132 B2 * | 11/2004 | Tomimori | .................... | 439/76.1 |
| 7,044,751 B2 * | 5/2006 | Takanashi et al. | ........... | 439/76.2 |
| 7,077,692 B2 * | 7/2006 | Chintala | ....................... | 439/500 |
| 7,361,030 B2 * | 4/2008 | Inoue et al. | ................... | 439/76.1 |
| 7,651,345 B2 * | 1/2010 | Tomioka et al. | ................ | 439/97 |
| 2002/0022387 A1 * | 2/2002 | Sumida | ........................ | 439/76.2 |
| 2005/0026467 A1 * | 2/2005 | Smirra | ......................... | 439/76.1 |
| 2006/0089019 A1 * | 4/2006 | Mitani | ......................... | 439/76.2 |

FOREIGN PATENT DOCUMENTS

JP 2003-532584 A 11/2003

* cited by examiner

*Primary Examiner* — Ross Gushi
(74) *Attorney, Agent, or Firm* — Buchanan Ingersoll & Rooney PC

(57) ABSTRACT

An electric connecting structure between a substrate and an electric component includes a substrate mounted in a case, an electric component assembled to a member which the case is mounted, a bus bar fixed to the case and connected to an electric circuit on the substrate at its one end and a spring disposed in compressed state between the bus bar and an electrode formed on the electric component. The substrate is electrical lyconnected to the electric component through the bus bar and the spring and a held portion formed on the spring is held by a spring holding portion integrally formed on the bus bar.

17 Claims, 9 Drawing Sheets

US 8,814,577 B2

ELECTRIC CONNECTING STRUCTURE BETWEEN SUBSTRATE AND ELECTRIC COMPONENT AND METHOD OF CONNECTION BETWEEN SUBSTRATE AND ELECTRIC COMPONENT

CROSS-REFERENCE TO RELATED APPLICATION

This application claims priority from Japanese Patent Application No. 2011-271140 filed on Dec. 12, 2011, the entire subject matter of which is incorporated herein by reference.

TECHNOLOGICAL FIELD

This invention generally relates to an electric connecting structure between a substrate and an electric component and a method of connection between a substrate and an electric component.

BACKGROUND DISCUSSION

A well known brake hydraulic pressure control device for vehicle having a function of ESC (Electronic Stability Control), ABS (Anti Lock Brake System) or EHB (Electro-Hydraulic Brake, i.e. Brake system or brake control controlling hydraulic pressure electronically) includes a hydraulic block in which components such as electromagnetic valve and so on for electrically adjusting or controlling hydraulic pressure are incorporated and a case in which a substrate is mounted and which is combined with the hydraulic block.

In this kind of the device, it is necessary to connect electrically the electromagnetic valves for switching brake circuit and hydraulic pressure sensor and so on with necessary places of the substrate. The electromagnetic valves, the hydraulic pressure sensor and so on are mounted in the hydraulic block.

A structure disclosed in JP-A-2003-532584 is known as one of a method of electrical connection. A brake device disclosed in this document includes odd-shaped coil springs which are disposed between the hydraulic pressure sensor mounted in the hydraulic block (valve block) and the substrate. Thereby, electric continuity between electrode pads formed on the hydraulic pressure sensor and electrode pads formed on the substrate is established.

The odd-shaped coil springs are inserted into odd-shaped holes formed on the case. Large diameter portions of the odd-shaped coil springs are nipped between the case and the substrate and the odd-shaped coil springs are held. Thus, the coil springs function as an electrical conducting material and the hydraulic pressure sensor and so on which the value of current-carrying is not so much can be electrically connected to a circuit on the substrate through the coil springs.

In the electric connecting structure disclosed in the above prior document, the electrode pads for contacting with the coil springs which are formed on the substrate have to be in position corresponding to a position of the electrode pads formed on the other electric component (the hydraulic pressure sensor and so on). Therefore, the layout of elements on the substrate is restricted.

For example, there is a case that the mounting of the other element on the position of the substrate corresponding to the electrode of the electric component is desirable in order to improve the area efficiency of the substrate. Since the electrode pads for contacting with the coil springs have be formed on the position of the substrate corresponding to the electrode pads of the electric component, however, the adoption of the desirable layout have to give up. Thereby, a case which is not accommodated a request of further downsizing of the substrate is caused.

Meanwhile, electrodes which correspond to the electrodes of the electric component can be formed on the case and can be connected to the electric circuit on the substrate. In this structure, when the electrode formed on the case are electrically connected to the electrodes of the electric component by the method disclosed in the above prior document, the number of parts and the labor hour for manufacturing are increased and the cost increases are caused.

SUMMARY

It is an object of the present invention to provide an electric connecting structure between a substrate and an electric component and a method of connection between a substrate and an electric component. which overcome the above drawbacks.

In order to achieve this objective, there is provided an improved electric connecting structure between a substrate and an electric component which includes a substrate mounted in a case, an electric component assembled to a member which the case is mounted, a bus bar fixed to the case and connected to an electric circuit on the substrate at its one end, and a spring disposed in compressed state between the bus bar and an electrode formed on the electric component, wherein the substrate is electrically connected to the electric component through the bus bar and the spring and a held portion formed on the spring is held by a spring holding portion integrally formed on the bus bar.

BRIEF DESCRIPTION OF THE DRAWING FIGURES

The foregoing and additional features and characteristics of the present invention will become more apparent from the following detailed description considered with reference to the accompanying drawing figures wherein.

Figure 6:
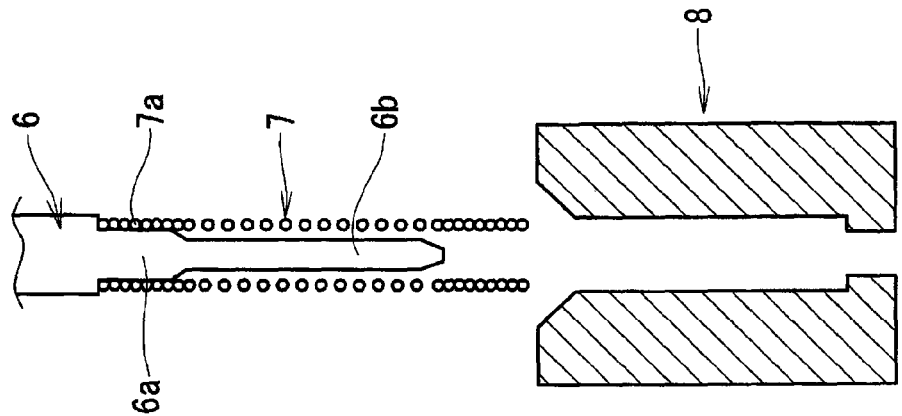
Figure 6:
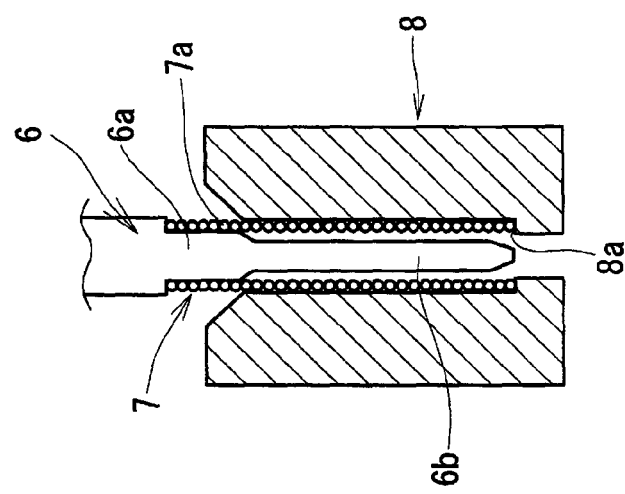
Figure 6:
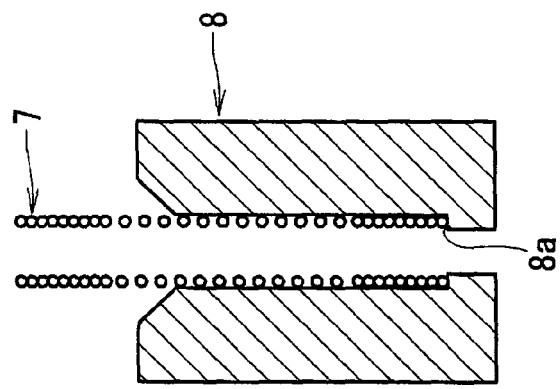
Figure 7:
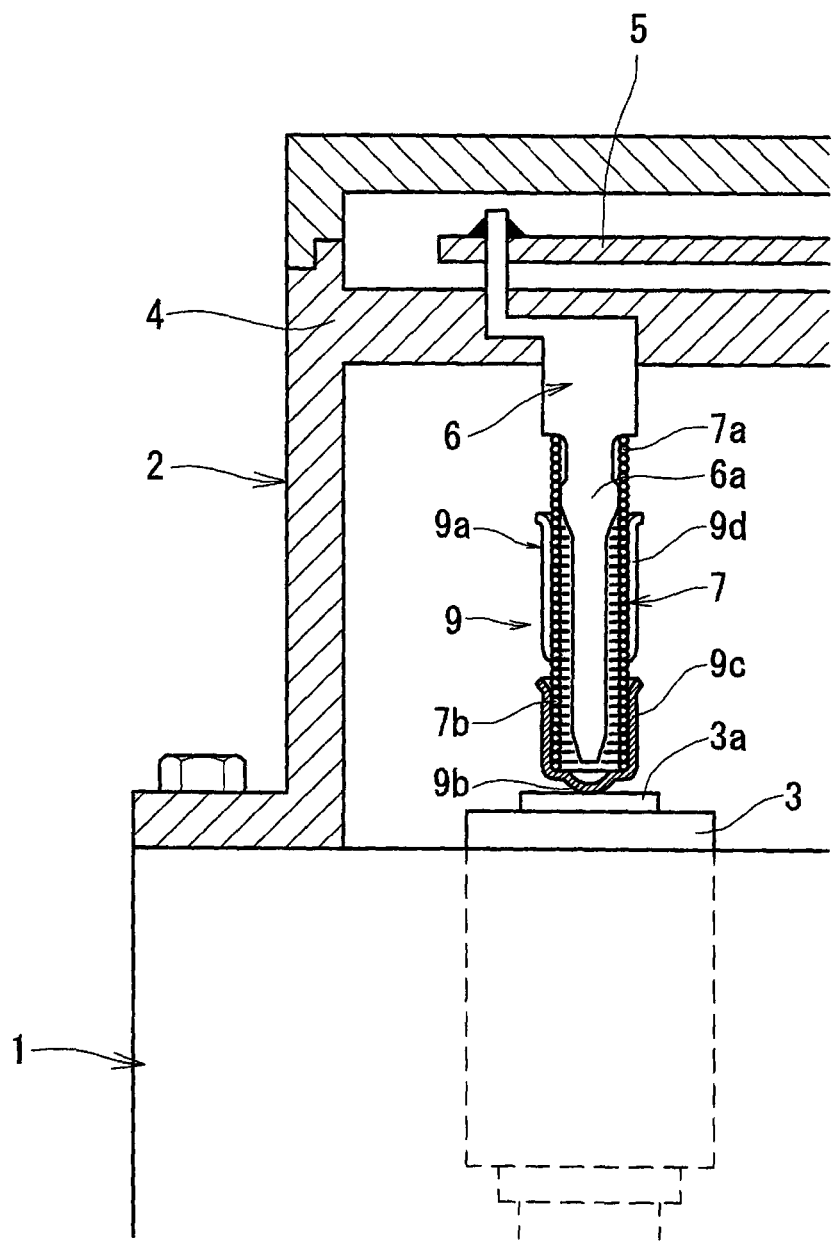
Figure 8:
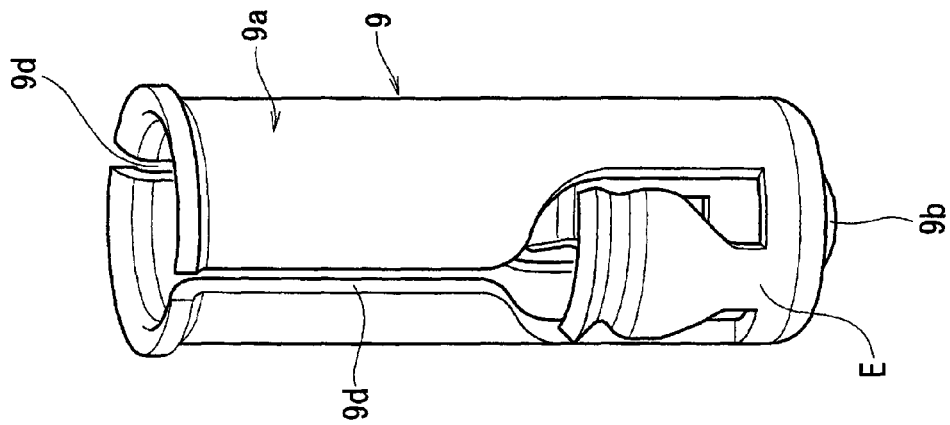
Figure 9:
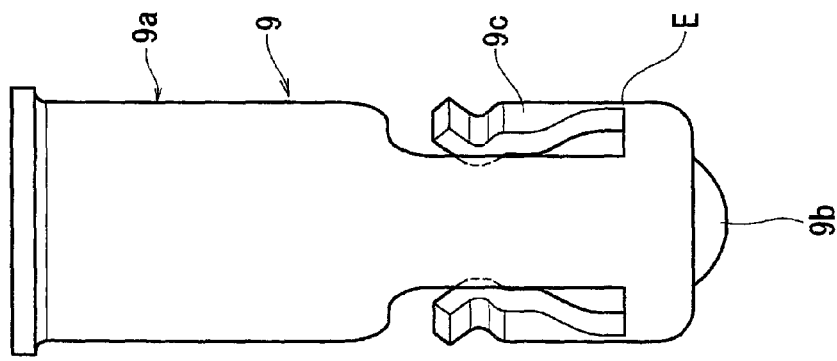
Figure 10:
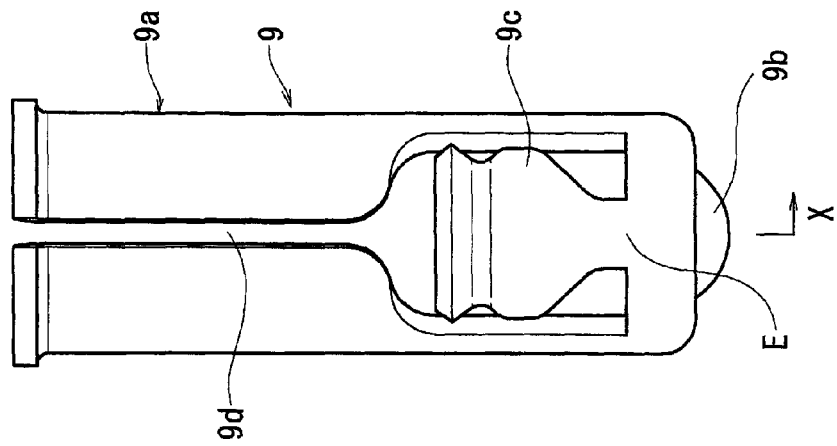
Figure 11:
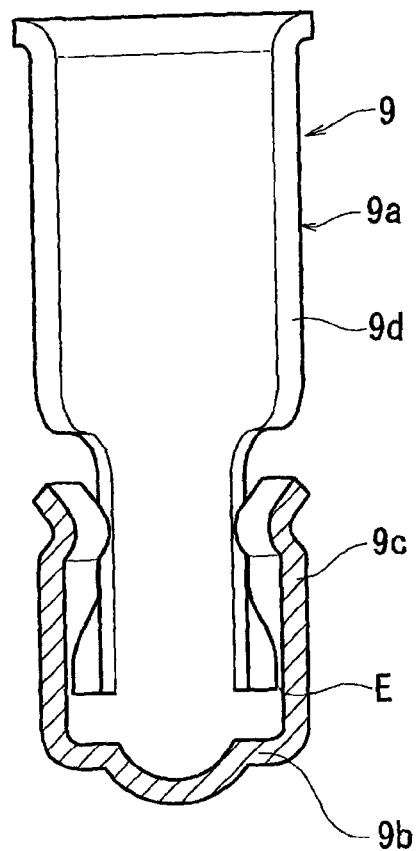
Figure 12:
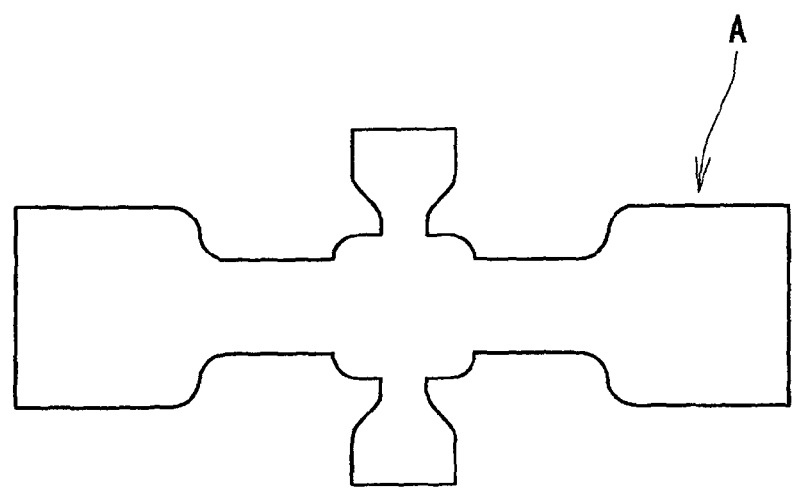
Figure 13:
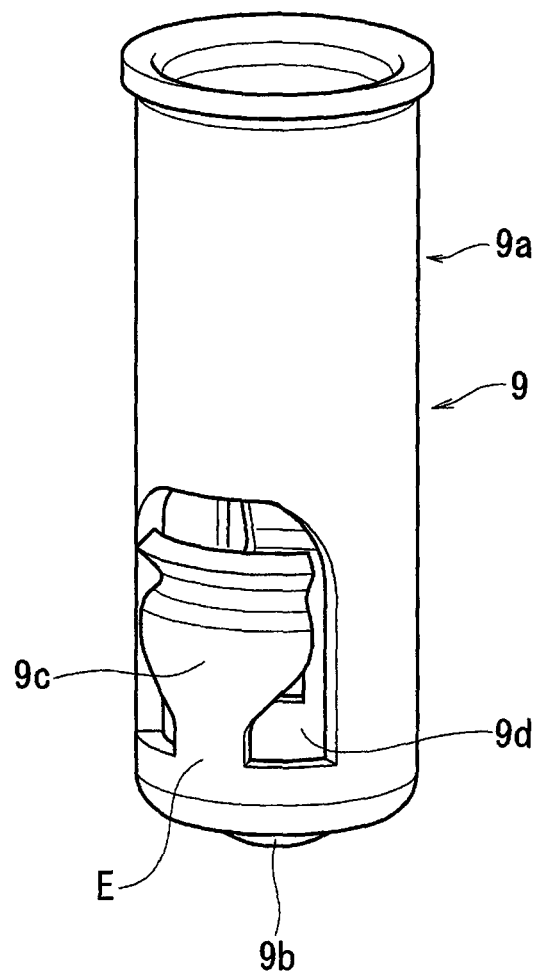
Figure 14A:
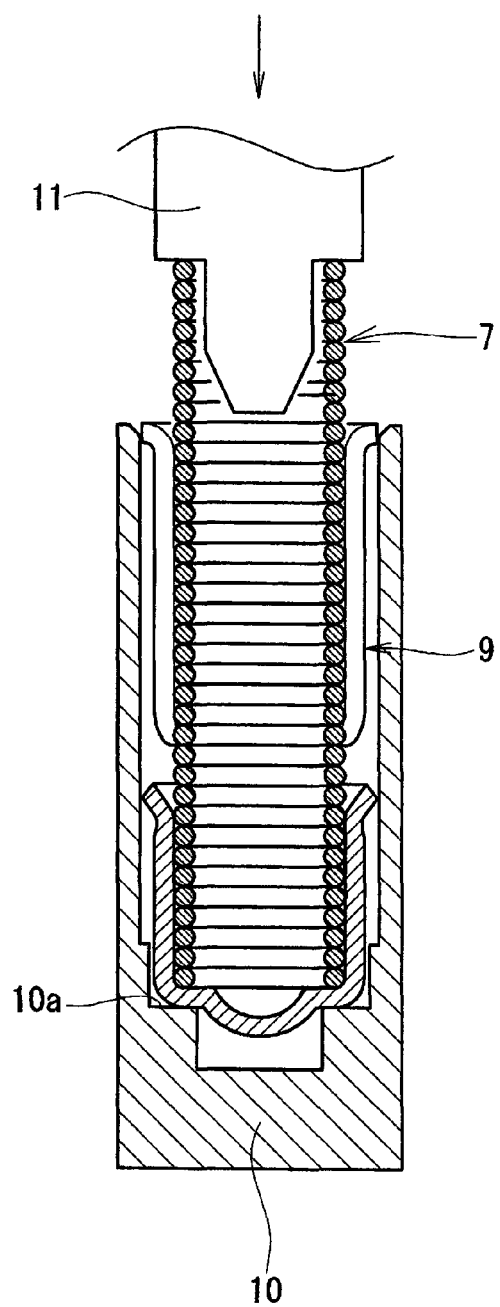
Figure 14B:
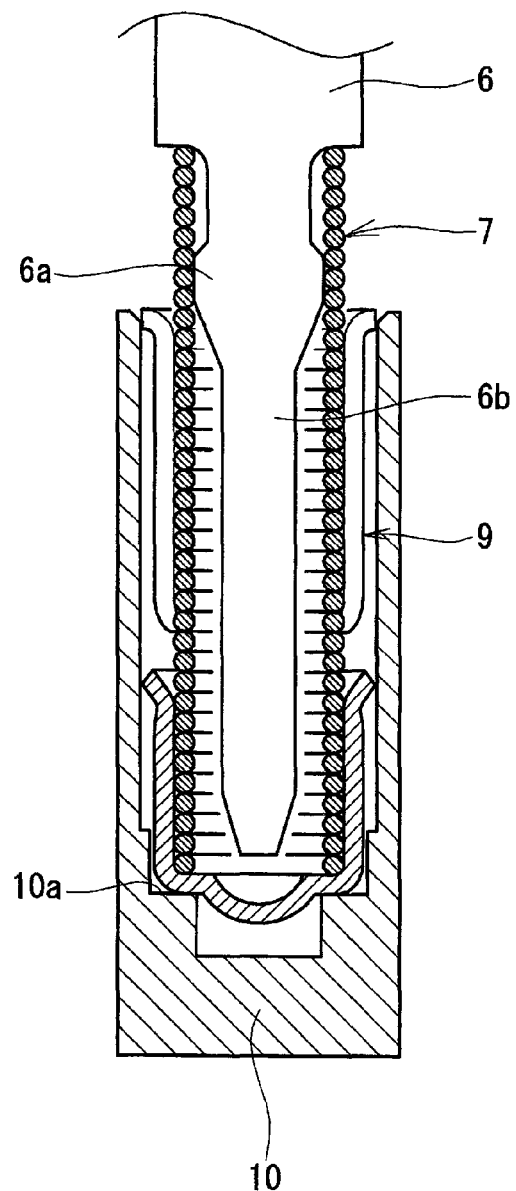

FIG. 6(*a*) to FIG. 6(*c*) are an explanation drawings illustrating one example of a method for mounting the spring on the bus bar according to an one embodiment of the present invention;

FIG. 7 is a cross-sectional view illustrating an electric connecting structure according to another embodiment of the present invention;

FIG. 8 is a perspective view of a conductive member adopted to the electric connecting structure illustrated in FIG. 7;

FIG. 9 is an elevation view of the conductive member illustrated in FIG. 8;

FIG. 10 is a side view of the conductive member illustrated in FIG. 8;

FIG. 11 is a cross-sectional view of the conductive member illustrated in FIG. 10 along the line X-X;

FIG. 12 is a development view of the conductive member illustrated in FIG. 8;

FIG. 13 is a perspective view illustrating another example of the conductive member; and FIG. 14(a) and FIG. 14(b) are process drawings illustrating a method for mounting three members consisting of the bus bar, the spring and the conductive member according to the present invention.

DETAILED DESCRIPTION

Figure 1:
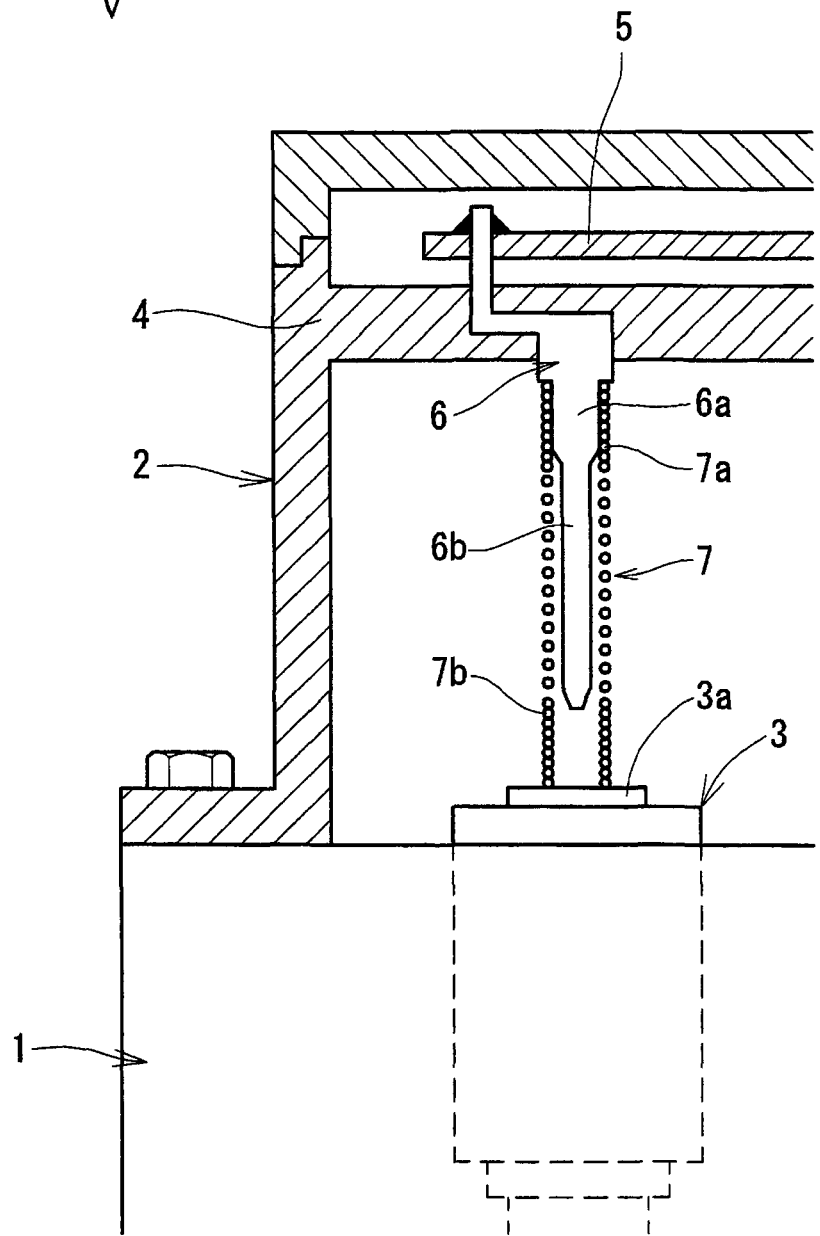
FIG. 1 is a cross-sectional view illustrating a part of a hydraulic pressure control device for vehicle adopted an electric connecting structure according to an one embodiment of the present invention.

An electric connecting structure constituted in accordance with preferred embodiments of the present invention will be described with reference to attached drawings. FIG. 1 shows a part of a hydraulic pressure control device to which the electric connecting structure of the present invention is adopted. The hydraulic pressure device includes a hydraulic block 1 and an electric control unit 2 which is combined with the hydraulic block 1. The electric control unit 2 controls an electric motor (not shown) for driving a pump mounted on the hydraulic block 1 and electromagnetic valves for controlling hydraulic pressure.

Figure 2:
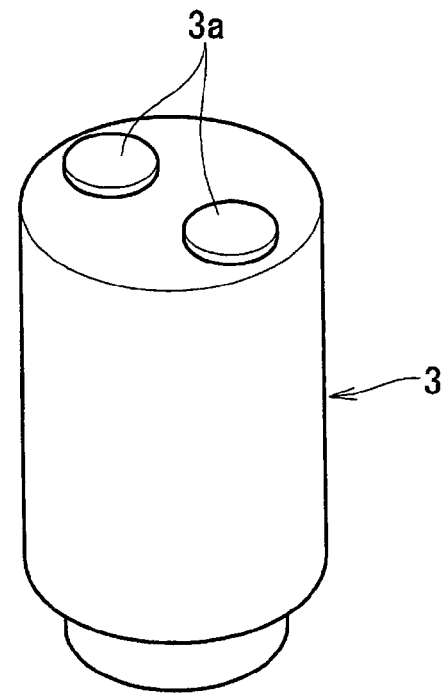
FIG. 2 is a perspective view of a hydraulic pressure sensor as an electric component illustrated in FIG. 1.

An electric component (a hydraulic pressure sensor in FIG. 1) 3 is mounted on the hydraulic block 1. The electric component 3 has electrodes 3a at its upper end. As shown in FIG. 2, the electrodes 3a consists of a negative electrode and a positive electrode. Since the electric connection between both electrodes and an electric circuit are performed by connecting portions having same structure, respectively, the following is a description of one connecting portion. The electrodes may be formed more than three.

The electric unit 2 includes a case 4 made of resin and a substrate 5 mounted in the case 4. The case 4 is fixed to the hydraulic block 1 by bolts and so on. Bus bars 6 are fixed to the case 4.

The bus bar 6 is electrically connected to an electric circuit (not shown) on the substrate at its one end. The one end of the bus bar 6 is connected to the electric circuit at the position which does not correspond to the electrode (the electrode pad) 3a of the electric component 3. A convex spring holding portion 6a is formed on the other end of the bus bar 6 and is extended toward the electric component 3.

Figure 3:
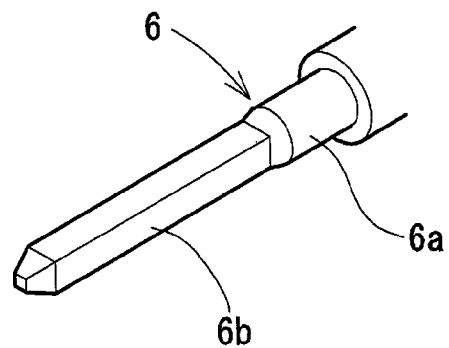
FIG. 3 is a perspective view of one example of a configuration of a bus bar illustrated in FIG. 1.
Figure 4:
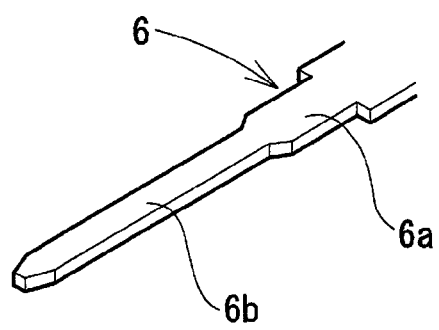
FIG. 4 is a perspective view of another example of a configuration of a bus bar illustrated in FIG. 1.

The shape of the spring holding portion 6a is determined taking into consideration the performance of the assembly of a spring and the prevention of the position gap of the spring. Accordingly, it is desirable that the spring holding portion 6a has a circular cross-section as shown in FIG. 3. However, the spring holding portion 6a may have an angular cross-section as shown in FIG. 4. Further, the spring holding portion 6a may be fitted into the coil spring and may not be pressed into the coil spring.

Figure 5:
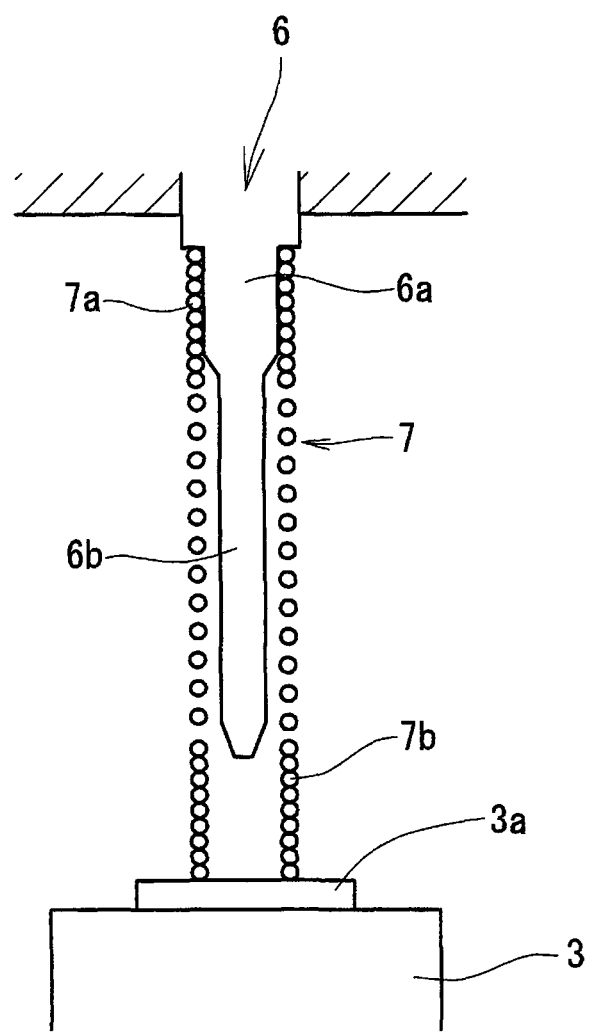
FIG. 5 is cross-sectional view of an electric connecting portion by a spring illustrated in FIG. 1.

As shown in FIG. 5, a spring (a coil spring) 7 is disposed between the electrode 3a of the electric component and the bus bar 6. The spring 7 is disposed under the compression state. The electrode 3a and the bus bar 6 are electrically conducted through the spring 7. Thereby, the electric component 3 and the electric circuit on the substrate 5 are electrically connected through the spring 7 and the bus bar 6.

The outer diameter of the spring 7 is constant along its entire length. The spring 7 has a held portion 7a at its bus bar side end portion. The spring holding portion 6a of the bus bar 6 is pressed into the held portion 7a of the spring 7 and the held portion 7a is fixed on the outer circumference of the spring holding portion 6a. Thereby, when the case 4 is mounted on or removed from the hydraulic block 1, the case 4 and the spring are handled in one body.

The held portion 7a is constituted by a closely-attached winding portion of the spring 7 which can not compress in the axial direction. Thereby, the load under the state of the compression of the spring 7 (elastic resilience) is stabilized.

The bus bar 6 has a guide portion 6b for guiding the coil of the spring at its top end. The guide portion 6b has a size which a clearance is formed between the inner circumference of the spring 7 and the guide portion 6b. The guide portion 6b prevents the portion of the spring 7 located close to the electrode from moving in the radial direction of the spring 7 beyond the clearance.

When the ratio (L/D) between the length of the spring 7 (L) and the diameter of the spring 7 (D) increases, the spring 7 bends laterally and is easy to move in the radial direction. The guide portion 6b prevents the spring 7 from moving in the radial direction and makes the electrode side end portion of the spring contact with the electrode 3a surely. Thereby, the bad conductive condition and the short can be prevented. In FIG. 3, the cross-section of the guide portion 6b is a regular square. However, the cross-section of the guide portion 6b may be a rectangle shape or polygonal, or circular shape.

A closely-attached winding portion 7b is formed at the electrode side end portion of the spring 7. The length and the position of the closely-attached winding portion 7b is adjusted so that the closely-attached winding portion 7b and the top end of the guide portion 6b are partially overlapped under the condition that the case 4 is fixed to the hydraulic block 1 (the spring 7 is compressed until the usage state shown in FIG. 5). Thereby, the prevention of the radial movement of the spring 7 by the guide portion is further stabilized.

Further, the shape of the closely-attached winding portion 7b is the same as the held portion 7a. Thereby, there is no directionality for mounting the spring 7 and the performance of the assembly is improved.

The spring holding portion 6a of the bus bar 6 is pressed into the held portion 7a of the spring 7 by hand work or a method shown in FIG. 6. In this method, firstly the spring 7 is inserted into a hole of a tubular or cylindrical jig 8 having a spring receiving surface 8a at its inside and is held by the tubular jig 8. (FIG. 6(a)) Then, in this state, the tubular jig 8 and the bus bar 6 held on the case 4 are relatively approximated and the spring holding portion 6a is pressed into the held portion 7a. (FIG. 6(b)) Then, the tubular jig 8 and the bus bar 7 are separated and spring 7 is mounted on the bus bar 6. (FIG. 6(c))

According to this method, the press fitting process can be mechanized. After the process of this method, the case 4 is fixed to the hydraulic block 1 and the spring 7 is disposed between the bus bar 6 and the electrode 3a of the electric component under the compressed condition. Thereby, the electric component 3 and the electric circuit on the substrate can be easily electrically connected.

Next, another embodiment in which the bus bar and the electrode of the electric component are electrically connected through the spring and a conductive member will be described with reference to FIGS. 7 to 13. FIG. 7 shows an electric connecting structure in which a cap shaped conductive member 9 is added to the electric connecting structure shown in FIG. 1. The other members in another embodiment are the same as the embodiment shown in FIG. 1. Therefore, the same numerals used in FIG. 1 are used to the same members in FIG. 7 and the descriptions thereof are omitted.

The conductive member 9 is pressed onto the electrode 3a of the electric component 3 by the spring 7 and make the spring 7 and the electrode 3a connect electrically. As shown in FIGS. 8 to 11, the conductive member 9 has a guided portion 9a which is guided or supported by the guide portion 6b of the bus bar 6. The guided portion 9a is provided with a guided surface (inner circumferential surface) which can contact with the outer circumference of the spring 7 and the position gap of the conductive member 9 is prevented by the guide portion 6a. Thereby, the contact between the electrode 3a and the conductive member 9 is stabilized.

Further, the conductive member 9 includes a bottom wall 9b which is pressed onto the electrode 3a by the spring 7 and a plurality of retaining portions 9c which are formed together with the bottom wall 9b and which are projected from the bottom wall 9b toward the substrate 5 side. The retaining portions 9c nip the end portion of the spring 7 positioned at the side of the electrode 3a by their elastic resilience generated due to the press fit. The bottom wall 9b is provided with a spherical surface which contacts with the electrode 3a and thus the bottom wall 9b contacts with the electrode 3a in a condition close to point contact. Therefore, if the contact point of the bottom wall 9b with respect to the electrode 3a moves from the extended line of the center of the bus bar, the change of the contacting condition hardly ever occur.

The guided portions 9a and the retaining portions 9c are separated from each other and the base ends E of the guided portions 9a are continued into the bottom wall 9b at the position avoiding the retaining portions 9c. The diameter of the neighborhood of top ends of the retaining portions 9c is narrowed down toward inside and is smaller than the outer diameter of the spring 7. Thereby, the retaining portions 9c have interference with respect to the outer circumference of the spring 7 and nip the electrode side end portion of the spring 7 pressed into between the retaining portions 9c by the elastic resilience generated due to the press fit. Therefore, the structure of the conductive member 9 does not become complex.

Further, in the previous state which the case 4 is mounted on the hydraulic block 1, the bus bar 6, the spring 7 and the conductive member 9 are handled in one body and the assembling of the electric connecting portion becomes easy. The guided portion 9a extends from the bottom wall 9b toward the substrate 5 and the extending amount of the guided portion 9a is larger than the projected amount of the retaining portions 9c. Thereby, the variation in the interference of the spring is suppressed small and the expansion and contraction of the spring 7 is stabilized. The width of the part of the guided portions 9a extended toward the substrate side than the retaining portions 9c is wider than the width of the base end E side disposed between the adjacent retaining portions 9c. Thus, the guide by the bus bar through the spring is stabilized.

The conductive member 9 shown in FIG. 8 to FIG. 11 is formed by the bending work of the plate material A such as copper plate which is punched out a shape shown in FIG. 12. In this bending work, the guided portions 9a are formed cylindrically and the bottom wall 9b is formed spherically, thus, the workability is excellent. Further, in this structure, slits which split longitudinally the guided portions 9a are formed. It is able to use the slits as a fluid exhaust passage. Therefore, when the gold coating and so on is done to the conductive member 9, the plating solution does not remain the inside of the conductive member 9. Therefore, the spring and the conductive member are prevented from transforming by the remained plating solution.

The conductive member 9 may be formed to a shape shown in FIG. 13. The conductive member 9 shown in FIG. 13 is formed by the drawing compound of the material plate. After the drawing, a part of the obtained cylindrical part having a bottom is cut and risen and the retaining portions 9c are formed. In this structure, since the guided portion 9a is cylindrically formed, the springback in forming does not occur and the dimension accuracy is improved. Further, if the cutting hole for forming the retaining portions 9c are formed larger, it is able to use the cutting hole as a fluid exhaust passage 9d and it is able to prevent the plating solution from remaining inside of the conductive member 9.

FIG. 14(a) and FIG. 14(b) show a method for integrally assembling the bus bar 6, the spring 7 and the conductive member 9. As shown in FIG. 14(a), the conductive member 9 is inserted into a hole of a cylindrical jig 10 which has a part receiving surface 10a inside. In this condition, the spring 7 is inserted into inside of the conductive member 9. Then, the bus bar side end portion side of the spring 7 projected from the conductive member 9 is pressed by a pressing jig 11 in the direction which the spring 7 is compressed and the electrode side end portion of the spring 7 is pressed into between the retaining portions 9c.

Next, the bus bar 6 fixed to the case 4 is inserted into the bus bar side end portion of the spring 7. Then, the cylindrical jig 10 and the bus bar 6 are approximated relatively and the spring holding portion 6a of the bus bar 6 is pressed into the inside of the held portion 7a. After that, the case 4 in which the substrate is disposed is mounted on the other part and the conductive member 9 is pressed onto the electrode 3a of the electric component 3 by the spring 7. According to the above process, it is able to electrically connect the electric component 3 to the electric circuit on the substrate through the spring 7 and the conductive member 9.

The principles, preferred embodiments and mode of operation of the present invention have been described in the foregoing specification. However, the invention which is intended to be protected is not to be construed as limited to the particular embodiments disclosed. For example, the electrical component connected to the electric circuit of the electric component is not limited to the hydraulic pressure sensor described in the embodiments and various sensors such as a temperature sensor, a magnetic field sensor and so on or an electrical component other than sensors can be used. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric connecting structure between a substrate and an electric component comprising:
    a substrate mounted in a case;
    an electric component assembled to a member on which the case is mounted;
    a bus bar fixed to the case and connected to an electric circuit on the substrate at its one end; and
    a spring disposed in compressed state between the bus bar and an electrode formed on the electric component;
    wherein the substrate is electrically connected to the electric component through the bus bar and the spring and a held portion formed on the spring is held by a spring holding portion integrally formed on the bus bar.

2. An electric connecting structure between a substrate and an electric component according to claim 1, wherein a guide portion is formed on the top end of the spring holding portion of the bus bar and is extended from the spring holding portion so that a clearance is formed between the guide portion and the inner circumference of the spring.

3. An electric connecting structure between a substrate and an electric component according to claim 2, further comprising a conductive member pressed onto the electrode by the spring and electrically connecting between the spring and the electrode, wherein a guided portion disposed on the outer circumference of the spring and guided by the guide portion of the bus bar through the spring is formed on the conductive member.

4. An electric connecting structure between a substrate and an electric component according to claim 3, wherein the conductive member holds an electrode side end portion of the spring.

5. An electric connecting structure between a substrate and an electric component according to claim 4, wherein the spring is a coil spring and the electrode side end portion of the coil spring is pressed into the conductive member so that the electrode side end portion is held by the conductive member.

6. An electric connecting structure between a substrate and an electric component according to claim 5, wherein the conductive member is provided with a bottom wall which is pressed onto the electrode by the spring, a plurality of retaining portions which are projected from the bottom wall and which nip the electrode side end portion of the spring by elastic resilience generated by the press fit and the guided portion which has a guided surface being able to contact with the outer circumference of the spring, and wherein the guided portion and the retaining portions are separated from each other and a base end of the guided portion is continued into the bottom wall at the position avoiding the retaining portions.

7. An electric connecting structure between a substrate and an electric component according to claim 6, wherein the guided portion is extended from the bottom wall toward the substrate and the extending amount of the guided portion is smaller than the projecting amount of the retaining portions.

8. An electric connecting structure between a substrate and an electric component according to claim 7, wherein the width of the part of the guided portion extended toward the substrate side than the retaining portions is wider than the width of the base end side disposed between the adjacent retaining portions.

9. An electric connecting structure between a substrate and an electric component according to claim 3, wherein a fluid exhaust passage which extends from an inner surface of a wall of the guided portion to an outer surface thereof is formed in the conductive member.

10. An electric connecting structure between a substrate and an electric component according to claim 3, wherein the conductive member is provided a spherical contact surface which contacts with the electrode.

11. An electric connecting structure between a substrate and an electric component according to claim 1, wherein a convex portion which extends toward the electric component and which functions as the spring holding portion is formed at the other end of the bus bar and is fitted into the spring so that the spring is held by the bus bar.

12. An electric connecting structure between a substrate and an electric component according to claim 1, wherein the spring is a coil spring and the held portion is formed at the bus bar side end portion of the coil spring, and wherein the spring holding portion is pressed into the held portion so that the held portion is fixed to the outer circumference of the spring holding portion.

13. An electric connecting structure between a substrate and an electric component according to claim 1, wherein the spring is a coil spring and a closely-attached winding portion is formed at the bus bar side end portion of the coil spring, and wherein the held portion is formed by the closely-attached winding portion.

14. An electric connecting structure between a substrate and an electric component according to claim 1, wherein the spring is a coil spring, and a guide portion is formed on the top end of the spring holding portion of the bus bar and is extended from the spring holding portion so that a clearance is formed between the guide portion and the inner circumference of the coil spring, and wherein a closely-attached winding portion is formed at the electrode side end portion of the coil spring and the closely-attached winding portion and the top end of the guide portion are partially overlapped under the condition that the case is mounted on the member.

15. An electric connecting structure between a substrate and an electric component according to claim 14, wherein the closely-attached winding portion of the electrode side end portion and the held portion of the bus bar side end portion are formed of the same shape, respectively.

16. A method of connection between substrate and electric component which comprises the step of:
 inserting a coil spring having a held portion at its electrode side end portion into a hole of a cylindrical jig having a spring receiving surface at its inside for holding the coil spring on the cylindrical jig;
 approximating the cylindrical jig and a bus bar fixed to a case;
 pressing a spring holding portion integrally formed on the bus bar into the inside of a held portion formed on the bus bar side end portion of the coil spring;
 mounting the case in which a substrate is assembled on a member; and
 disposing the coil spring in the compression state between bus bar and an electrode of an electric component mounted on the member for electrically connecting between the electric component and an electric circuit on the substrate.

17. A method of connection between substrate and electric component which comprises the step of:
 inserting a conductive member having a guided portion guided by a guide portion of a bus bar and retaining portions for holding an electrode side end portion of a spring into a hole of a cylindrical jig having a part receiving surface at its inside for holding the conductive member on the cylindrical jig;
 inserting the spring having a held portion at its bus bar side end portion into the inside of the conductive member;
 pressing the bus bar side end portion of the spring projected from the conductive member by a pressing jig on which the bus bar side end portion is fitted so as to compress the spring;
 pressing an electrode side end portion of the spring into between the retaining portions;
 inserting the bus bar fixed to a case into the bus bar side end portion of the spring;
 approximating the cylindrical jig and the bus bar fixed to the case;
 pressing a spring holding portion integrally formed on the bus bar into the inside of the held portion formed on the bus bar side end portion of the spring;
 mounting the case in which a substrate is assembled on a member; and
 pressing the conductive member onto the an electrode of an electric component for electrically connecting between the electric component and an electric circuit on the substrate through the spring and the conductive member.

* * * * *